(12) United States Patent
Gerber

(10) Patent No.: US 8,899,597 B2
(45) Date of Patent: Dec. 2, 2014

(54) CLAMPING SYSTEM

(75) Inventor: Ernst Gerber, Reigoldswil (CH)

(73) Assignee: Rego-Fix AG, Tenniken (CH)

( * ) Notice: Subject to any disclaimer, the term of this patent is extended or adjusted under 35 U.S.C. 154(b) by 864 days.

(21) Appl. No.: 12/819,436

(22) Filed: Jun. 21, 2010

(65) Prior Publication Data

US 2010/0327541 A1   Dec. 30, 2010

(30) Foreign Application Priority Data

Jun. 26, 2009   (CH) .......................................... 997/09

(51) Int. Cl.
| | | |
|---|---|---|
| B23B 31/107 | (2006.01) | |
| B23B 31/00 | (2006.01) | |
| B23B 31/11 | (2006.01) | |
| B23B 31/20 | (2006.01) | |

(52) U.S. Cl.
CPC ............ *B23B 31/107* (2013.01); *B23B 31/005* (2013.01); *B23B 31/11* (2013.01); *B23B 31/1122* (2013.01); *B23B 31/202* (2013.01); *B23B 2231/0284* (2013.01); *B23B 2231/04* (2013.01); *B23B 2231/2027* (2013.01); *B23B 2260/1388* (2013.01); *B23B 2260/146* (2013.01)
USPC ..... 279/99; 279/87; 279/7; 279/8; 408/239 R

(58) Field of Classification Search
CPC   B23B 31/11; B23B 31/1175; B23B 31/1122; B23B 31/1078; B23C 5/10; B23C 2210/02; B23C 2240/32
USPC ......... 279/99, 101, 79, 80, 152, 76, 141, 7, 8, 279/83, 102, 103; 408/239 R
See application file for complete search history.

(56) References Cited

U.S. PATENT DOCUMENTS

| | | | | |
|---|---|---|---|---|
| 926,845 | A * | 7/1909 | Bradley | 279/103 |
| 1,027,039 | A * | 5/1912 | Down | 279/99 |
| 1,480,355 | A * | 1/1924 | Webster | 279/91 |
| 1,820,644 | A * | 8/1931 | Bach | 279/99 |
| 2,125,005 | A | 7/1938 | Jearum | |
| 2,152,072 | A * | 3/1939 | Maute | 279/76 |
| 2,896,955 | A * | 7/1959 | Treppard | 279/7 |
| 3,518,738 | A | 7/1970 | Porter | |
| 3,984,192 | A * | 10/1976 | Wanner et al. | 408/226 |
| 4,253,488 | A * | 3/1981 | Leverberg | 137/382 |
| 4,668,138 | A * | 5/1987 | Carter | 409/234 |
| 4,850,759 | A * | 7/1989 | Strand et al. | 408/239 A |
| 5,114,286 | A * | 5/1992 | Calkins | 408/226 |
| 5,582,494 | A * | 12/1996 | Cook | 409/234 |
| 7,207,755 | B2 * | 4/2007 | Berglow | 409/232 |
| 7,513,724 | B2 * | 4/2009 | Kakai | 409/234 |
| 2003/0210963 | A1 * | 11/2003 | Kakai et al. | 408/231 |
| 2006/0051174 | A1 * | 3/2006 | Pantzar et al. | 409/234 |
| 2009/0184479 | A1 * | 7/2009 | Guy | 279/99 |
| 2010/0007102 | A1 * | 1/2010 | Chen | 279/99 |

FOREIGN PATENT DOCUMENTS

| | | | |
|---|---|---|---|
| DE | 102010006918 A1 * | 8/2011 | |
| WO | WO2005/000505 A2 | 1/2005 | |

* cited by examiner

*Primary Examiner* — Eric A Gates
*Assistant Examiner* — Paul M Janeski
(74) *Attorney, Agent, or Firm* — Hammer & Associates, P.C.

(57) ABSTRACT

The clamping system for clamping a shank, for example a tool shank, into a seat has a spiral-shaped circumferential groove arranged in the wall of the seating hole and a clamping wedge which is provided with corresponding spiral-shaped ribs and is insertable into a recess on the shank.

3 Claims, 6 Drawing Sheets

CLAMPING SYSTEM

FIELD OF INVENTION

The invention relates to a clamping system for clamping a cylindrical shank, for example a tool shank, which is provided with a carrier surface into an axial seating hole of a seat.

BACKGROUND OF THE INVENTION

DIN 1835-2 describes chucks with lateral clamping screws. These standardized chucks are characterized by a good form closure shape (clamping screw—carrier surface on the cutting tool shank). However, they no longer meet the properties that are required today, such as true running accuracy, balance quality and clamping forces.

For this reason, the embodiment described in the standard 1835-2 is already today improved in that the seating hole is made offset from the true running center at a distance complying with the tolerance to be expected including the deflection. This was intended to remove the eccentricity with the cutting tool being clamped.

High Performance Cutting (HPC) is cutting with a metal-removal rate that is distinctly increased as compared with conventional cutting methods, owing to higher cutting speeds and feed rates. The difference between HPC and high speed cutting is fluid but, in general, HPC is said to achieve slower cutting speeds yet distinctly increased cutting depths and, therefore, poorer surface qualities. HPC not only comprises the cutting process but incorporates all factors involved in production with the aim of increasing both productivity and process reliability. As a result, the requirements set for the holding force of a clamping tool are enormous.

The true running accuracy as well as the balance quality of the tool clamping device must be optimized in order to be able to follow this trend. Examples of such an optimization are described in WO 2005/000505 and DE 19717005.

The invention aims at using the high holding force with form closure of tool shanks according to DIN 1835-2 and, at the same time, obviating drawbacks such as eccentricity caused by one-sided radial clamping and unbalance.

SUMMARY OF THE INVENTION

This problem is solved by the invention by means of a spiral-shaped circumferential groove arranged in the wall of the seating hole in the manner of an internal thread and a clamping wedge which is provided with spiral-shaped ribs matching the groove, said clamping wedge being insertable into a recess on the shank.

According to a preferred embodiment of the invention, the groove and, accordingly, the ribs of the clamping wedge have different thread angles, wherein the angle of the thread flank facing the tool side is flatter than the angle of the thread flank facing the machine side.

According to a further preferred embodiment of the invention, the clamping wedge consists of a resilient material. According to a further embodiment of the invention, the ribs are prolonged beyond the lateral boundary of the clamping wedge such that they extend across more than the half of the shank circumference.

BRIEF DESCRIPTION OF THE DRAWINGS

Below, preferred exemplary embodiments of the invention will be described by means of the accompanying drawings. In the drawings.

DETAILED DESCRIPTION OF THE INVENTION

Figure 1:
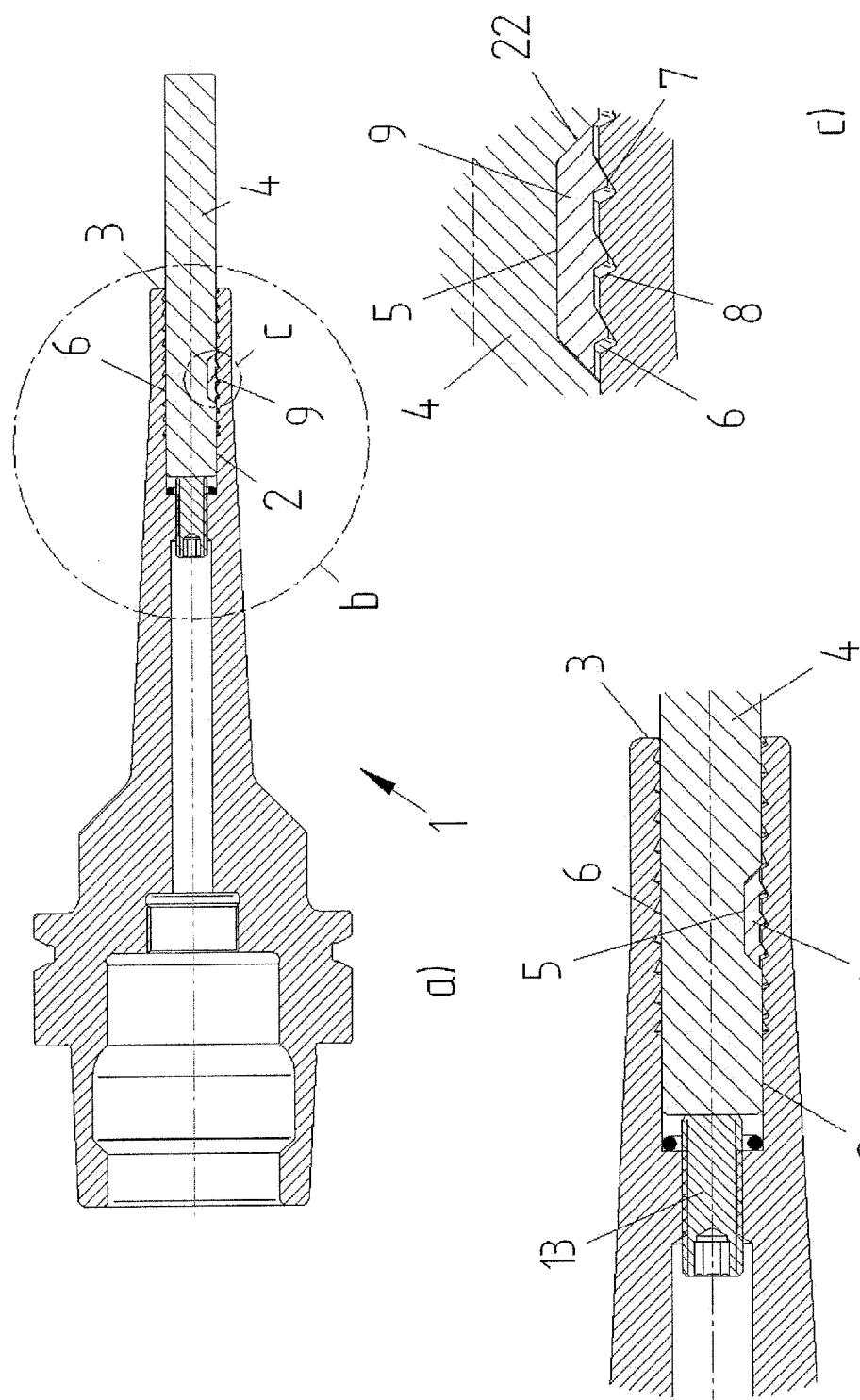
FIG. 1 is a sectional view of a Weldon slot with an inserted clamping wedge.

The Weldon slot 1, an axial sectional view of which is shown fully in FIG. 1a, magnified once in FIG. 1b and magnified twice in FIG. 1c, has a coaxial cylindrical seating hole 2 which extends from its tool-sided end face 3 towards the machine side. A Weldon shank 4 which is provided with a flat rectangular carrier surface 5 is seated in the seating hole, said carrier surface 5 being formed by a recess.

The wall surface of the seating hole 2 is provided with a thread-shaped helical groove 6 which extends from the tool-sided end of the seating hole and across a major part of the axial length thereof. In contrast to a conventional thread, the groove has different thread angles. The angle of the thread flank 7 facing the tool side has a flat form. This thread flank serves to divert the axial force to the radial force during the clamping process. The angle of the thread flank 8 facing the machine side has a steep form.

A clamping wedge 9 is arranged in the recess of the Weldon shank, said clamping wedge 9, in essence, corresponding to the dimensions of the recess and, in particular, having a flat rectangular contact surface which abuts against the carrier surface. The clamping wedge can either be inserted only or be connected to the shank in a detachable or an undetachable manner.

Figure 2:
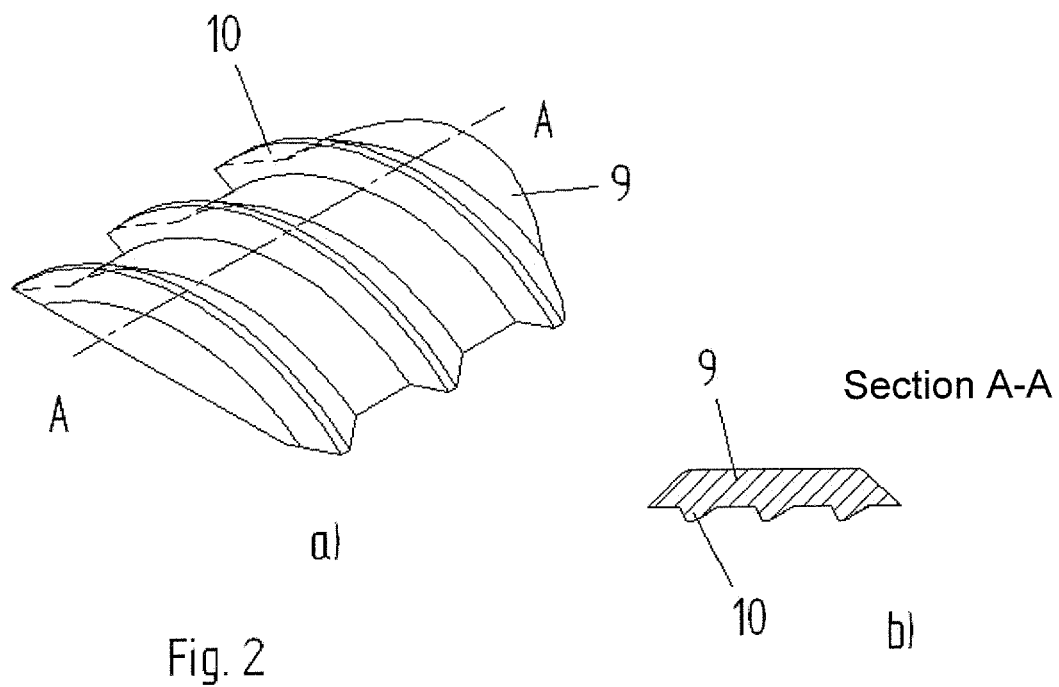
FIG. 2 shows one embodiment of a clamping wedge.

As shown in FIG. 2, the clamping wedge is provided with helical ribs 10 on its outside, said ribs 10 having the form of a partial external thread and fitting into the shape of the helical groove of the seating hole. FIG. 2a is a perspective view of the clamping wedge, while FIG. 2b is a sectional view taken from plane A-A. The thread flanks of the ribs with their different steepnesses can be distinctly seen. The clamping wedge consists of a pressure-resistant material, such as hard metal, ceramic, steel, etc.

Figure 3:
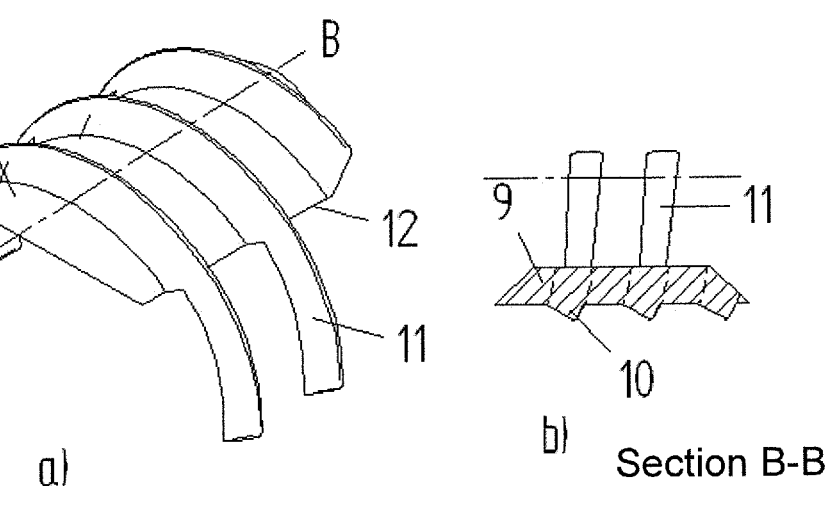
FIG. 3 shows a further embodiment of a clamping wedge.

In the embodiment of the clamping wedge shown in FIG. 3, the ribs 10 have extensions 11 which project beyond the two lateral boundaries 12 of the clamping wedge 9, this preferably such that they extend across an angle of more than 180° in their longitudinal direction. When this clamping wedge is inserted into the recess of the shank, the projecting ribs encompass the shank. Due to the ribs extending across more than half the circumference of the shank, the clamping wedge clicks into place while it is inserted. According to this embodiment, the clamping wedge consists of a pressure-resistant resilient material, such as spring steel.

Figure 4:
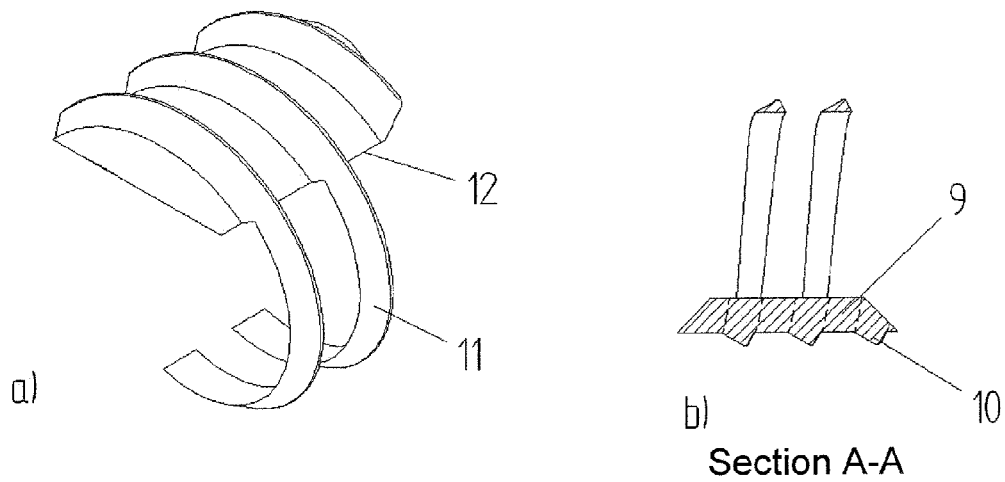
FIG. 4 shows yet another embodiment of a clamping wedge.

In the embodiment of the clamping wedge shown in FIG. 4, the extensions 11 of the ribs 10 project beyond the lateral boundary 12 of the clamping wedge on one side only. This embodiment of the clamping wedge also allows it to click into place on the shank, provided the ribs extend across more than half the circumference.

If the clamping wedge is located in the recess of the shank, the shank can be screwed into the seating hole. The combined shank-clamping wedge unit is screwed into the seating hole at least as far as necessary for the clamping wedge to be seated in the seating hole over its complete axial extension and can, over and above this, be screwed in as far as desired until the shank abuts against the machine-sided end of the seating hole or any other boundary.

To allow screwing the combined shank-clamping wedge unit into the seating hole, the tolerances of the clamping wedge and the associated combs are selected such that the comb of the clamping wedge has play in the groove. This play is eliminated as soon as force is axially applied onto the shank.

In order to clamp the shank, an axial force is applied onto the shank from the machine side, e.g. by means of a stud bolt 13. The recess of the shank is limited axially and has a flank 22 with a steepness of, for example, 45° according to standards. For this reason, the clamping wedge is prevented from giving way axially, and a radial pressure develops across the inclined planes of the flanks of the ribs and the groove, said radial pressure acting onto the clamping wedge and, therefore, onto the shank. The pitch of the helical groove and the helical ribs is less than the self-retention angle with the result that, while the axial pressure is developed for clamping the system, the shank cannot make any rotary motion which would cause unscrewing of said shank.

The contact surface of the clamping wedge on the shank is considerably larger in size than the circular contact surface of a radial screw, such as it is used according to the state of the art or as it is provided according to standards.

The spiral-shaped or thread-shaped groove and the corresponding ribs of the clamping wedge are made right-handed for standard cutting tools, such as drills, end mills, milling cutters, etc., which have cutting edges for chip removal with right-hand rotation. As a result, the tool tightens in a self-acting manner during machining. The pitch is made such that the tool shank cannot detach during machining but can be easily removed after machining despite the load occurring therein (vibration, working).

Figure 5:
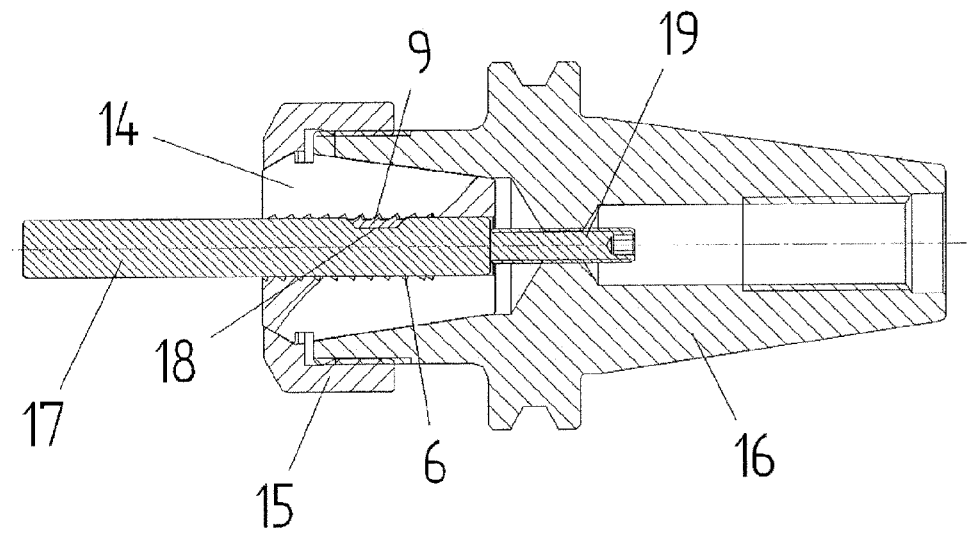
FIG. 5 is a sectional view of an ER clamping system with an inserted clamping wedge.

As shown in FIGS. 5 to 9, the clamping system according to the invention is not restricted to a Weldon shank but can be used along with other chucks or clamping sleeves. The system shown in FIG. 5 is an ER collet chuck 14 which is known as such and is retained in a collet seat 16 by means of a clamping nut 15. The seating hole of the collet chuck is provided with the helical groove 6. The tool shank 17 is provided with a recess 18 in which a clamping wedge 9 with corresponding ribs is located. A stud bolt 19 is arranged in the seat in order to apply the axial force required for clamping onto the shank.

Figure 6:
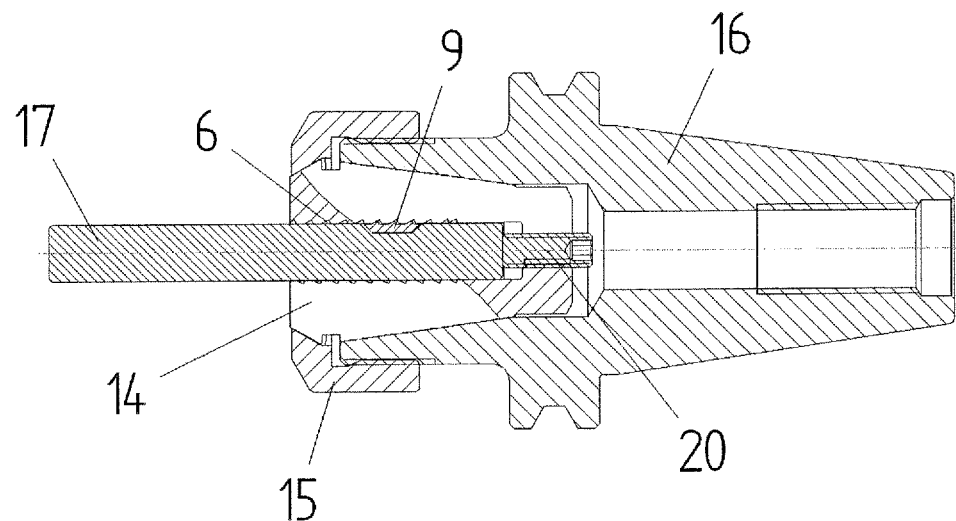
FIG. 6 is a sectional view of an alternative embodiment of an ER clamping system.

The system shown in FIG. 6 is an ER collet chuck, too, wherein here, however, the collet chuck itself is provided with the stud bolt 20 for clamping.

Figure 7:
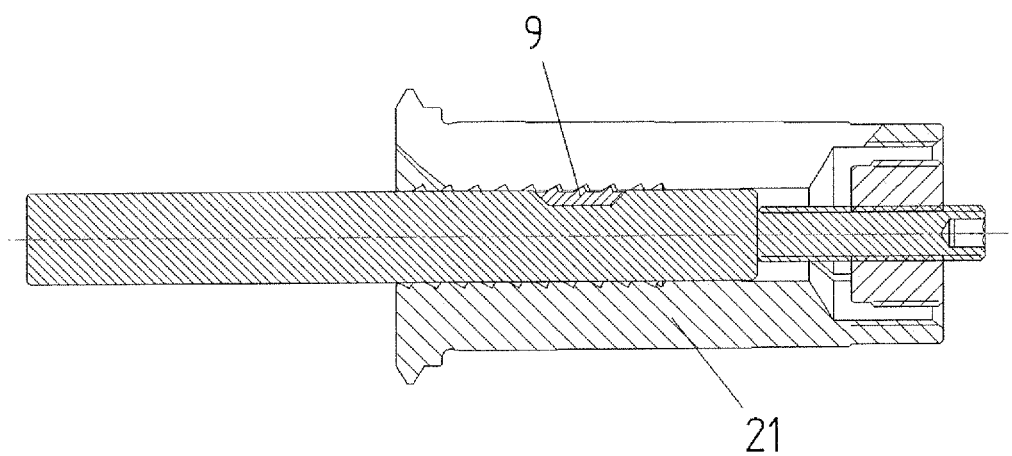
FIG. 7 is a sectional view of what is called a PG clamping system.

The system shown in FIG. 7 is what is called a PG chuck 21 comprising a seating hole whose cone angle is smaller than the self-retention angle.

Figure 8:
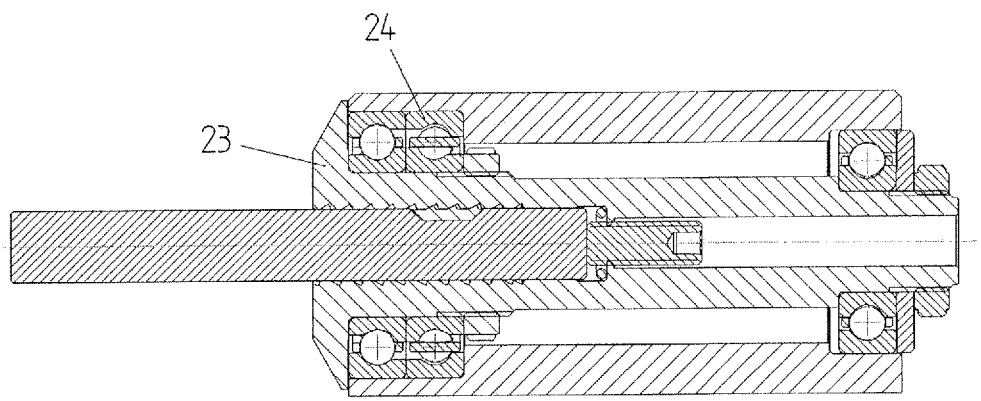
FIG. 8 is a sectional view of a machine spindle with a through hole.

As is shown by the system shown in FIG. 8, the clamping system according to the invention can also be used with spindles of milling machines and drilling machines as well as in spindles of driven tools where the seating shaft 23 with through hole is retained in roller bearings 24.

Figure 9:
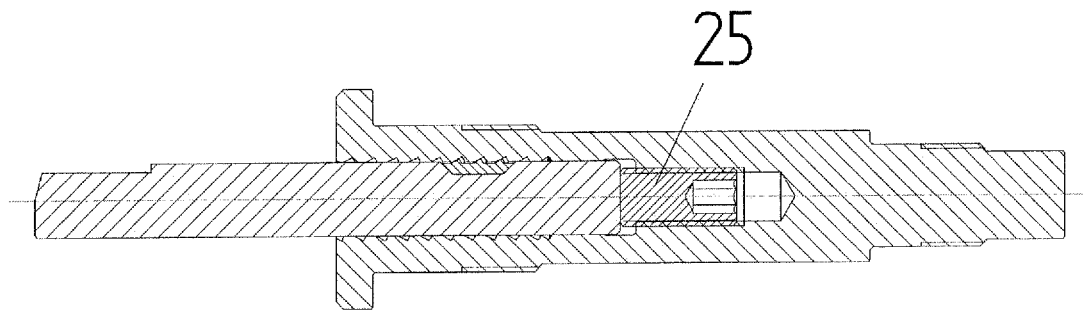
FIG. 9 is a sectional view of a machine spindle without through hole.

FIG. 9 also shows a seating shaft 23, however, without through hole for spindles. A clamping screw 25 serves as a stop screw which is used to adjust the length prior to inserting the tool. Subsequently, the tool shank is screwed in and the axial force is applied by tightening the shank against the stop screw by means of a hook wrench. To allow applying the hook wrench, the tool shank can be provided with appropriate recesses outside of the shank length that is to be screwed in.

Figure 10:
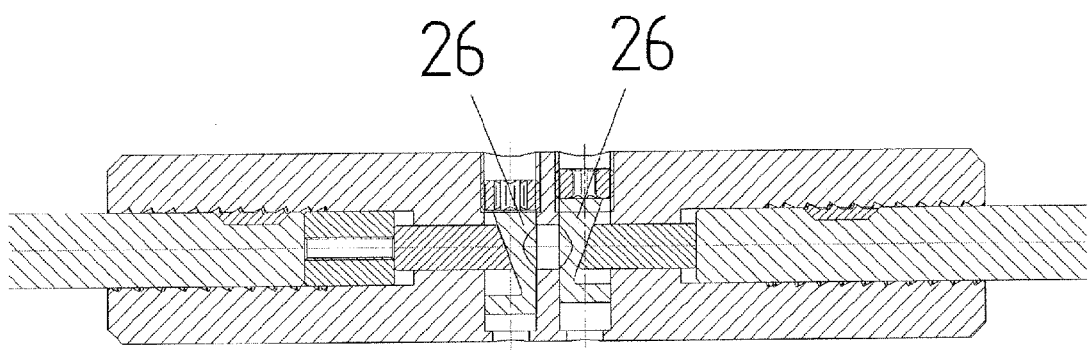
FIG. 10 is a sectional view of a double cylinder holder.

The clamping system according to the invention can also be used in the double cylinder holder shown in FIG. 10. This tool holder has a lateral stop adjustment/clamping device 26.

It is obvious by implication that, in addition to the clamping systems described above, other clamping systems are also suitable for using the solution according to the invention with an inserted clamping wedge, in particular including shrink chucks for thermally shrinking the tool shank, polygonal chucks, hydraulic expansion chucks, and the like.

As compared with the known clamping systems, the system described herein has a number of essential advantages: The axial locking screw allows adjusting the length of the tool shank in an optimal manner. The chuck jacket is not weakened by transverse holes for lateral locking screws. The solution according to the invention allows the smallest possible interference contour and a particularly slim design of the tool holder. What is more, the inside surface which is not interrupted by any transverse hole allows machining the seating hole more precisely. Finally, the clamping system according to the invention does not comprise any unbalance because the recess on the tool shank is completely filled by the clamping wedge.

I claim:

1. A tool clamping system comprising a tool holder with a cylindrical seating hole for receiving a tool shank and a tool having a substantially cylindrical tool shank to be seated in the seating hole, the system comprising:
    a spiral shaped circumferential groove located in the seating hole;
    a recess along a single side of the peripheral surface of the tool shank located at a portion of the shank to be received in the seating hole, the recess forming an axially aligned flat; and
    a clamping wedge body having dimensions which correspond to the dimensions of the recess so that the wedge is suited to engage into the recess, the wedge body having a first surface which is flat and dimensioned such that it abuts against, and directly opposite of the flat of the recess and a second surface provided with spiral-shaped ribs matching said groove of the seating hole, the ribs being located directly opposite the said flat of the recess.

2. The clamping system according to claim 1, characterized in that said clamping wedge consists of a resilient material.

3. The clamping system according to claim 1, wherein said ribs extend laterally beyond a lateral boundary of said wedge.

* * * * *